Feb. 7, 1933.         O. B. ANDREWS         1,896,601
BREAD BAND
Filed May 19, 1931        2 Sheets-Sheet 1
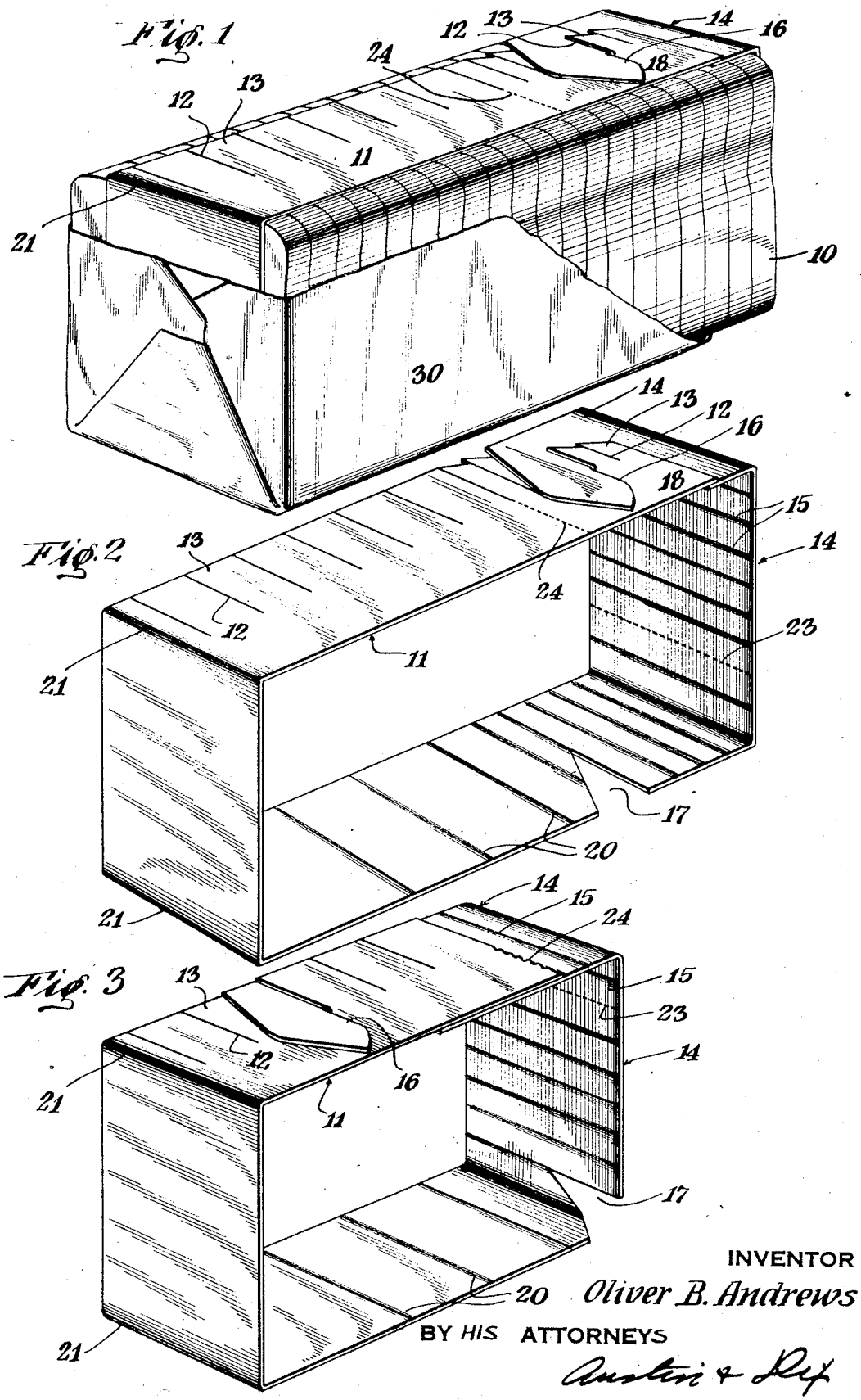
INVENTOR
Oliver B. Andrews
BY HIS ATTORNEYS
Austin & Ref

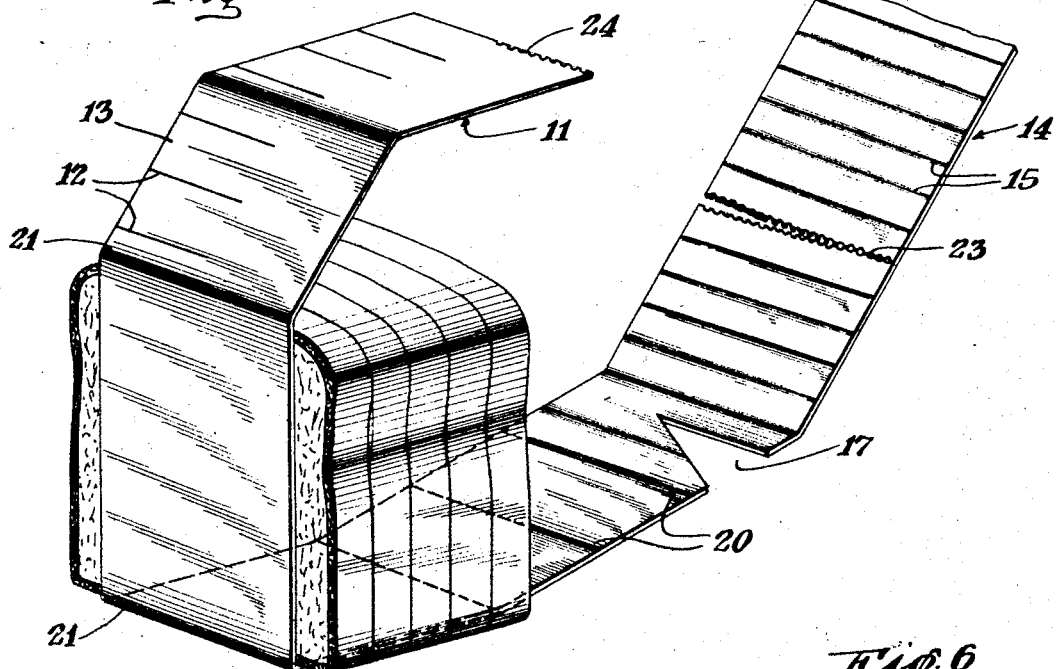
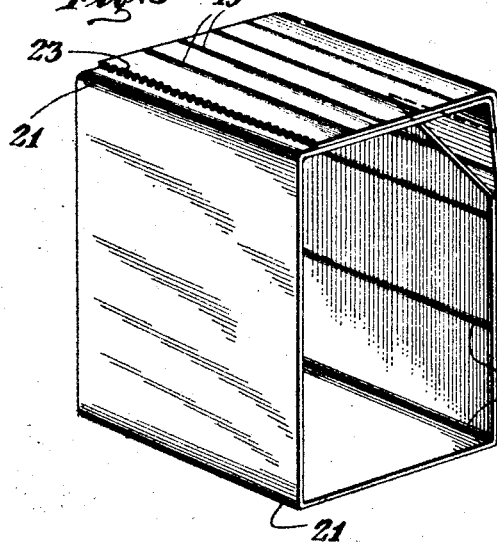
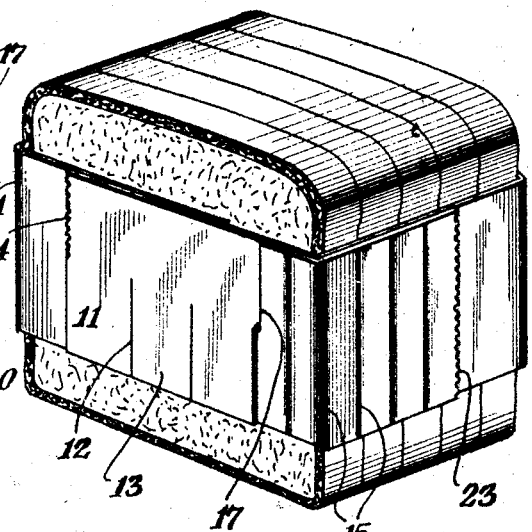
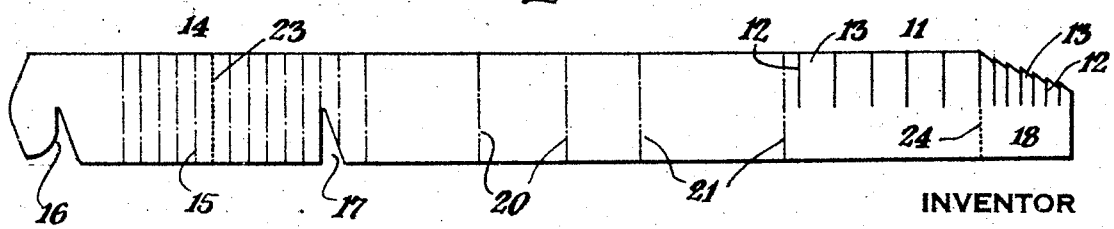

Patented Feb. 7, 1933

1,896,601

UNITED STATES PATENT OFFICE

OLIVER B. ANDREWS, OF CHATTANOOGA, TENNESSEE

BREAD BAND

Application filed May 19, 1931. Serial No. 538,450.

This invention relates to bread packages, and more particularly to a device for packing a loaf of sliced bread and for holding the same in substantially its original form whereby it may be handled as a loaf and maintained as such while various slices are removed therefrom for use.

The invention provides an adjustable band which is adapted to pass around the loaf of sliced bread and to be joined at the ends for holding the slices in their original relative positions. Means is provided for adjusting the band to fit loaves of various sizes and to fit loaves after various slices have been removed so that the remaining slices are always held in compact position.

The invention also provides an improved loaf package which is adapted to prevent excessive evaporation from the cut surfaces of the slices and to maintain the loaf in a fresh condition.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a perspective view of a loaf of sliced bread showing the band in place;

Fig. 2 is a perspective view of the band in assembled position;

Fig. 3 is a perspective view of the band adjusted for a smaller loaf;

Fig. 4 is a perspective view showing the means for adjusting the band of a still smaller loaf;

Fig. 5 is a perspective view of the band of Fig. 4 in assembled position;

Fig. 6 is a perspective view of the band of Fig. 4 in position about the sides of a loaf of bread; and Fig. 7 is a plan view of the blank from which the band is formed.

Like reference characters denote like parts in the several figures of the drawings.

In the following description and in the claims, various details will be identified by specific names for convenience, but they are intended to be as generic in their application as the art will permit.

Referring to the drawings more in detail the invention is shown as applied to a band adapted to encircle a loaf 10 of sliced bread. Said band is shown in Fig. 7 as formed from a long strip of box board and is provided at one end 11 with a plurality of slots 12 which are separated to form tongues 13 therebetween. The other end 14 is provided with a plurality of scores 15 about which the band may be bent and with a plurality of notches 16, 17 which are adapted to engage tongues 13.

A portion 18 of end 11 is tapered and the tongues 13 which are incorporated therein are tapered about a different angle whereby a serrated effect is produced which facilitates the insertion of notches 16 and 17 in the selected slot 12. The remainder of the tongues 13 are formed substantially wider than those adjacent the end inasmuch as the band will not require as fine adjustment after certain of the slices have been removed from the loaf. The band is also provided with scores 20, 21 which facilitates its bending around the corners of the loaf and is perforated as at 23 between notches 16 and 17 and as at 24 at an intermediate point between certain tongues 13 so that the end portions of the band can be torn off when the band is adjusted to fit a smaller loaf, for example, after a large number of the slices have been removed.

Referring to Figs. 1 and 2, it will be noted that the band is assembled about a loaf by being bent about scores 15, 20, 21 and that notch 16 is inserted in engagement with a suitable tongue 13. The band in this position holds the complete loaf for shipment. After certain of the slices have been removed the band is shortened by bringing notch 16 into engagement with other tongues 13, for example, tongues lying inside of perforation 24 and thereafter tearing end section 18 about said perforation.

The band may be still further shortened by tearing end 14 about perforation 23 as illustrated in Fig. 4, and thereafter bringing notch 17 into engagement with a suitable tongue 13 as shown in Figs. 5 and 6. In this position the band will hold the few remaining slices after the others have been removed for use.

It is obvious that the band may be placed about the loaf in any convenient manner, as for example, about the top and bottom as shown in Fig. 1, or about the sides of the loaf as shown in Fig. 6, or in any similar position. The various scores 15 permit the band to be bent at suitable places for adjusting itself to loaves of various dimensions and the plurality of tongues 13 and notches 16 and 17 permits the ends of the band to be locked at various selected positions.

It has been found that the adjustable band results in bringing the outer crusted edges of the loaf tightly together so as to prevent or minimize evaporation and loss of moisture from the interior of the loaf. The band accordingly prevents the bread from quickly becoming stale. In certain instances, however, it may be desirable to utilize a moisture proof wrapper whereby the evaporation of moisture is still further retarded. For this purpose the wrapper 30 of Fig. 1 is positioned about the loaf and band in a manner similar to applying a wrapper to an uncut loaf. The wrapper thus not only assists in maintaining the bread in a fresh condition, but also assists in holding the loaf in its original physical form whereby it may be readily handled.

While certain novel features of the invention have been disclosed and are pointed out in the annexed claims, it will be understood that various omissions, substitutions and changes may be made by those skilled in the art without departing from the spirit of the invention.

What is claimed is:

1. A band for sliced bread or the like comprising a strip of flexible box board having a plurality of slots at one end thereof spaced to provide tongues therebetween, and a plurality of notches at the other end thereof adapted to adjustably engage said tongues, said band having perforations between said notches whereby the outer section may be torn off when not in use.

2. A band for sliced bread or the like comprising a band of box board having at one end a plurality of tongues and at the other end a plurality of notches adapted to variably engage said tongues for locking the band in closed position, said band having perforations between said notches whereby the outer section may be torn off when not in use.

3. A band for sliced bread or the like comprising a band of box board having at one end a plurality of tongues and at the other end a plurality of notches adapted to variably engage said tongues for locking the band in closed position, said band having perforations between certain of said notches whereby the outer section may be torn off when not in use, said band also being perforated intermediate certain of said tongues whereby the unused portion of said tongues may be removed.

4. A band for sliced bread or the like comprising a band of box board having at one end a plurality of spaced slots forming tongues therebetween, the extreme end portion being tapered and the tongues within said portion having a different taper to provide a serrated edge, said band being perforated at an intermediate point whereby a portion of said band may be removed when not required for use, the other end of said band being provided with a plurality of means adapted to selectively engage the selective tongue for locking said band about said loaf.

5. A band for sliced bread or the like comprising a band of box board having at one end a plurality of tongues and at the other end a plurality of notches adapted to engage said tongues and having a plurality of scores formed at said other end to facilitate adjustment of said band about loaves of various sizes and being perforated between certain of said notches whereby unused portions of said band may be removed.

6. A band for sliced materials maintained in loaf form comprising a band of flexible material having at the two ends thereof notches and tongues adapted to cooperate therewith for locking said band about said loaf and having a plurality of score lines to facilitate the bending thereof about loaves of various sizes and having perforations to permit the unused portions of the ends to be removed when the band is adjusted to an intermediate position.

In testimony whereof I have hereunto set my hand and seal.

OLIVER B. ANDREWS.